July 8, 1958  R. J. STEVENS  2,842,067
PUMPS FOR FLUIDS, MORE ESPECIALLY LIQUIDS
Filed Oct. 3, 1955  2 Sheets-Sheet 1

INVENTOR
Ronald J. Stevens
BY
Watson, Cole, Grindle & Watson
ATTORNEYS

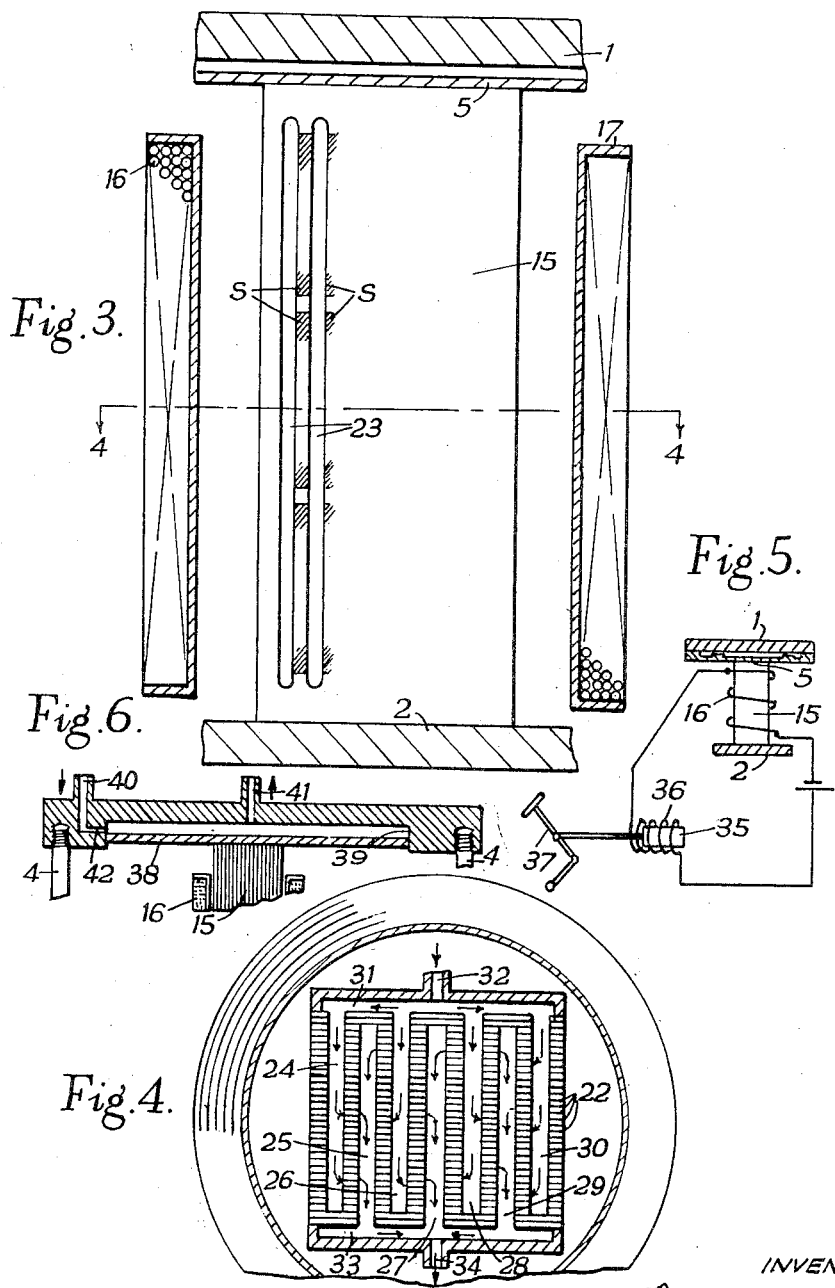

United States Patent Office 2,842,067
Patented July 8, 1958

2,842,067

PUMPS FOR FLUIDS, MORE ESPECIALLY LIQUIDS

Ronald John Stevens, Kingston Hill, England

Application October 3, 1955, Serial No. 538,105

Claims priority, application Great Britain October 12, 1954

14 Claims. (Cl. 103—152)

This invention relates to pumps for fluids, more especially liquids. It has particular reference to internal combustion engine fuel injection pumps. It is, however, not limited thereto but is broadly applicable to pumps for fluids in general, irrespective of whether the fluid be a liquid or a gaseous medium and irrespective of the character or nature of the installation or system in which the pump is employed.

The feed and metering of liquid fuel to internal combustion engines requires the supply of small units of the fuel in varying quantity in very short intervals of time. Piston-like elements are often used for this purpose having adjustable stroke, but such elements suffer from mechanical wear due to the very fine clearances involved. Also, owing to the fact that the quantity of fuel required from each stroke of the pump is a very small quantity, for example of the order of only a few cubic millimetres, pumps employing piston-like elements are difficult to build and maintain in effective working order.

It has therefore been specially in view in the present invention to provide a form of pump for the supply of liquid fuel to an internal combustion engine, e. g. of the diesel type, which will be free from these disadvantages of the known piston-type pumps.

According to the invention there is provided a diaphragm or piston pump for fluids, more especially liquids, driven as regards the oscillating movement of the diaphragm or reciprocatory movement of the piston by thrust derived from an element responsive to magnetic flux or electric potential in the sense that said flux or potential, or a change in the magnitude thereof, produces a dimensional or form change in the element resulting in movement of one terminal part of the element relatively to another, the diaphragm or piston being operatively connected to the first mentioned of said terminal parts in such a manner as to follow the movements thereof.

The pump may be designed to deliver at each oscillation of the diaphragm or reciprocation of the piston a small measured quantity of liquid.

The quantity of fluid deliverable from the pump per oscillation of the diaphragm or reciprocation of the piston may be variable at will by varying the magnitude of the operating flux or potential applied to the responsive element.

According to a generally preferred form of the invention the responsive element of the pump is a magnetostrictive element. It may, however, be an element whose operative change movement is due to piezo effects in the element.

Magnetostrictive elements are capable of high speed movement over a distance of a few microns with very great acceleration and of exercising an ultimate pressure in many cases of several hundred pounds per square inch. A magnetostrictive element is therefore eminently suited to serve as the responsive element in the novel pump of the present invention.

According to a further feature of the invention, the effective area of the diaphragm or piston of the pump is very large as compared with the amplitude of oscillation of the diaphragm or stroke of reciprocation of the piston. In this connection it will be observed that 3 cubic millimetres of liquid could be accommodated in a pump chamber of the following linear dimensions: 10 cm. × 10 cm. × 0.0003 mm., the last dimension being, as will be seen, only three-tenths of a micron. It will be seen, therefore, that if a cavity of such dimensions could be formed and liquid could be made to flow into it, only very slightly distortion of one or both of the walls of greatest area in the sense of movement towards and away from one another would be required to provide a pumping action sufficient to supply several cubic millimetres of liquid per cycle of distortion, and this consideration underlies the feature of the invention just referred to according to which the effective area of the diaphragm or piston is very large as compared with the operative movement of the diaphragm or piston in the functioning of the pump.

According to one convenient and generally preferred form of the invention, more especially in the case of a pump wherein, as aforesaid, the effective area of the diaphragm or piston is very large as compared wtih the operative movement of the diaphragm or piston in the functioning of the pump, the construction may be one in which the pump casing comprises a rigid block and a flat plate secured to one face of the block in face to face relation thereto and the pump chamber is constituted by an interfacial space between the block and the plate formed by a recess in the plate face or in the block face, or by the combination of two mutually opposed and complementary recesses, one in the plate face and the other in the block face, the plate forming the diaphragm of the pump.

In this event the construction may further be one in which the plate or the rigid block or each of these parts carries a projection extending into the pump chamber which, during the stroke of oscillatory movement of the diaphragm in the direction towards the block, operates to cut off one portion of the pump chamber from another portion thereof, while permitting the diaphragm to complete its said stroke in the direction towards the block, the arrangement being one in which one of said portions of the pump chamber is in communication with the outlet of the chamber and the other is in communication with the inlet of the chamber.

In this way a construction is provided in which the diaphragm fulfills a dual function in the operation of the pump, one part of its function being to force the fluid out of the pump chamber by way of the outlet thereof and the other part to control the inlet of the chamber in such a manner that during an initial portion of the stroke of oscillatory movement of the diaphragm in the direction towards the block (i. e. the pumping stroke of the diaphragm) back flow of the fluid out of the pump chamber by way of said inlet thereof is prevented, with the result that an accurately metered quantity of the fluid leaves the pump at each reciprocation of the diaphragm. In the case of an internal combustion engine fuel injection pump the diaphragm would operate against the resistance to flow of the fluid from the chamber caused by the choking effect of the injection nozzle or nozzles of the engine, while of course the fuel supply to the pump would be under the usual relatively low pressure of say a few pounds per square inch.

The recess or recesses aforesaid may conveniently be formed by electrolytically etching the face of the plate or block to the necessary depth. Alternatively the recess or recesses may be formed in the face of the plate or block by electro deposition of a relief or reliefs over selected areas of the face. In either of these ways the required depth of the recess may be obtained with great accuracy owing to the fact that the amount of metal removed or, as the case may be, added, according to whether the electrolytic etching is employed or electro deposition, is subject to the well known laws of Faraday.

It is to be understood, however, that the recess or recesses may be formed by any convenient method, e. g. moulding, casting or machining.

The invention will now be further described with reference to the accompanying drawings, which it is to be understood illustrate the invention by way of example.

Figure 1:
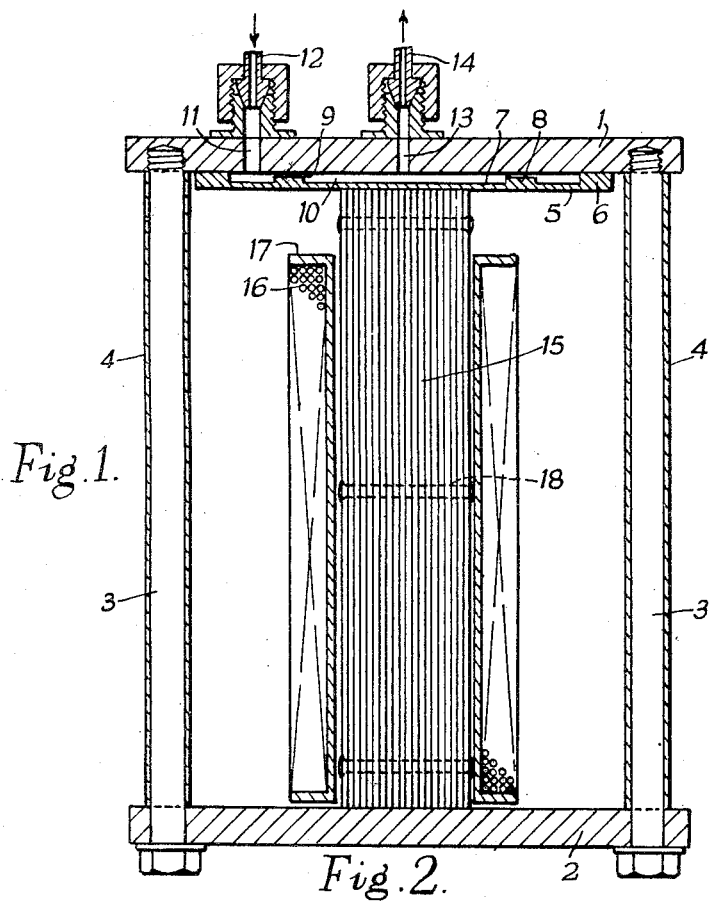
Figure 1 is a vertical section through a pump, for example an internal combustion engine fuel injection pump, constructed in accordance with the present invention.

Figure 3 is a fragmentary and somewhat diagrammatic vertical section through a pump, for example a fuel injection pump, constructed in accordance with the invention, the pump in this case incorporating also a filter for the fuel, said filter embodying the invention forming the subject matter of United States patent application Serial No. 529,772 filed August 22, 1955, and the arrangement being one in which the operating shock in the filter is derived from the responsive element of the pump;

Figure 4 is a cross-section through the pump of Figure 3 on the section line 4—4 of that figure;

Figure 5 is a diagrammatic view of one possible arrangement in which the energy supplied to the responsive element of the pump is variable at will to control the delivery rate of the pump under control from the accelerator pedal or equivalent speed control means of the engine; and Figure 6 is a fragmentary and largely diagrammatic view illustrating an embodiment of the invention in which the pump is a piston-type pump.

Like reference characters indicate like parts in the various figures.

Referring first to Figure 1, the pump shown in this figure comprises a rigid top plate 1 and a rigid bottom plate 2 rigidly secured together by bolts 3 threaded through tubular spacers 4, the spacers 4 being of precision length so as to ensure that the distance between the plates 1 and 2 is exactly the correct designed spacing of the plates.

The top plate 1 forms the "rigid block" hereinbefore referred to of the pump, and beneath it is a plate 5 forming the diaphragm of the pump, said plate 5 being held rigidly around the marginal portion 6 of the plate against the underside of the plate 1 with a fluid-tight sealing fit at the joint face.

The plate 5, which is circular, is formed with a shallow circular recess 7 in its upper face disposed concentrically with the peripheral edge of the plate. Upstanding from the bottom of the recess 7 is an annular projection 8 whose height dimension is somewhat less than the depth dimension of the recess, with the result that between the upper face of the projection and the underside of the plate 1 there is a slight clearance 9.

The recess 7 forms with the underside of the plate 1 a chamber 10. This chamber constitutes the "pump chamber" as hereinbefore referred to, and that portion of the chamber which is situated radially beyond the annular projection 8 communicates with an inlet port 11 in the plate 1 through which, from a supply conduit 12, the liquid fuel flows into the pump chamber from a conventional supply point for the fuel. The inlet port 11 constitutes as will be understood the "inlet" as hereinbefore referred to of the pump chamber. The centre portion of the chamber 10 communicates with an outlet port 13 in the plate 1 by way of which the liquid fuel flows out of the chamber to a delivery conduit 14 leading to the engine, either directly or by way of a distributor, according to the arrangement employed as hereinafter more particularly described.

The portion of the plate 5 disposed radially within the peripheral marginal portion 6 is flexible in order that the plate shall function as a diaphragm with freedom for flexing movement towards and away from the underside of the rigid plate 1. In so flexing the volume of the pump chamber 10 is of course varied to an extent proportional to the amplitude of the oscillation of the diaphragm, and in the course of its flexing movement in the direction of said underside of the plate 1 the upwardly directed face of the annular projection 8 comes into abutment with said underside so as to cut off the portion of the chamber radially beyond the projection from the portion radially within the projection; in other words, to cut off the inlet 11 from the outlet 13. Following said cut off the continued flexing movement of the diaphragm in the direction of the underside of the plate 1 results in a positive forcing of the liquid within the pump chamber, as far as that portion of the liquid is concerned which is contained within the centre portion of the chamber radially within the annular projection 8, out of the chamber by way of the outlet 13 and thence to the engine. With precision production of the parts it is possible in this way to produce a pump having an extremely accurately predeterminable delivery rate.

Beneath the diaphragm 5 is a laminated unit 15 composed of a suitable material, for example iron or nickel, having pronounced magnetostrictive properties. This unit is interposed between the underside of the diaphragm and the upper side of the bottom plate 2. It is held in this position, in rigid connection to the bottom plate on the one hand and to the diaphragm on the other so as to be devoid of any freedom for movement relatively to either of these parts, by any convenient means (not shown), and surrounding it is a coil 16 wound on a bobbin 17. Here again the bobbin is held in fixed position relatively to the bottom plate 1 by any suitable form of means (not shown). The laminae of the unit 15 are held together, for example by rivets 18.

The laminated unit 15 and the coil 16 form together, in accordance with the principal feature of the present invention, a driving means for the diaphragm 5 of the pump, with the result that the pump may be said to be driven, as regards the oscillating movement of the diaphragm, by thrust derived from an element responsive to magnetic flux in the sense that said flux, or a change in the magnitude thereof, produces a dimensional change in the element, namely a change in the length of the laminated unit 15, resulting in movement of one terminal part of the element relatively to another, the two "terminal parts" of the element being of course the top and bottom faces of the unit 15 and the diaphragm being operatively connected to the first mentioned of said terminal parts (said top face of the unit 15) in such a manner as to follow the movements thereof.

The necessary operating current may be supplied to the coil 16 from any suitable source, and it will be appreciated that as hereinbefore described the quantity of fuel deliverable from the pump per oscillation of the diaphragm is variable at will by varying the magnitude of the flux applied to the unit 15, which of course is varied by varying the current applied to the coil. It will also be appreciated that the responsive element of the pump in the particular form of the invention illustrated in Figure 1 consists in effect of a transducer comprising a core of magnetic material surrounded by a winding suitably excited. The excitation of the winding is preferably by condenser discharge via a distributor. Alternatively the winding may be excited by a supply derived from a rotating magnetic system feeding a series of transducers at appropriate intervals. In both of these arrangements it is assumed that there would be a series of pumps corresponding respectively to the series of engine cylinders to be supplied with fuel by way of the pumps, the pumps being operated in predetermined sequence to suit the firing sequence of the cylinders. According to an alternative arrangement, however, there may be a single pump arranged to serve all of the cylinders of the engine, the fuel being fed to the respective cylinders by way of a distributor in known manner.

If desired, and as already indicated herein, the "rigid block" element of the pump, namely the element constituted in the particular form of the invention illustrated in Figure 1 by the upper plate 1, may carry the projection 8, instead of the diaphragm, or there may be two projections, one on the diaphragm and the other on the rigid block element, co-operating together to provide the cut off action hereinbefore described in the operation of the pump. Also the projection or projections may take any desired form and may be located at any desired position in the pump chamber, according for example to the general design of the pump.

Figure 2:
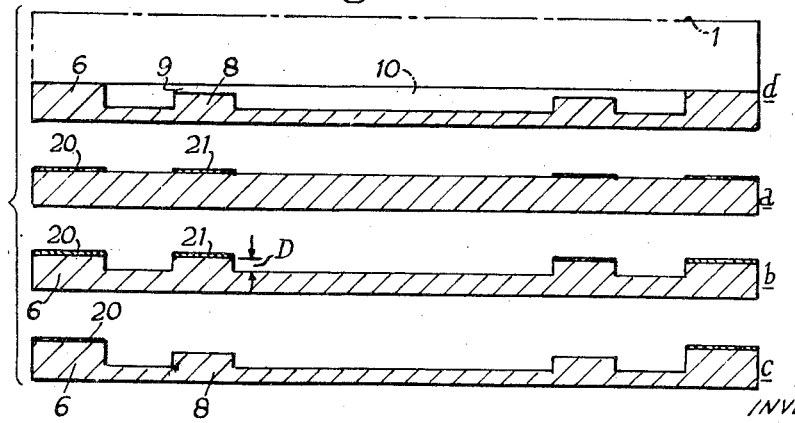
Figure 2 is a fragmentary and more or less diagrammatic representation of how according to one way the diaphragm of the pump may be produced by electrolytic etching as above described, parts *a, b* and *c* of the figure representing successive stages in the production of the diaphragm.

Referring now to Figure 2, the uppermost portion of this Figure, marked d, shows the completed (fully etched) diaphragm forming plate; portion a shows the plate prior to the commencement of the etching process, portion b, shows the plate in a partially etched condition and portion c again shows the plate in the completed (fully etched) condition. Said upper portion d also shows in chain line at 19 the outline of the block element (plate 1) of the pump.

The first stage in the etching process consists in applying over the upper face of the plate to be etched two rings 20, 21 of any suitable resist material. Etching is then commenced until a predetermined depth D (see portion b of Figure 2) of etching has been attained. Ring 21 is then removed and the etching process completed until the section of the plate has the form shown in portion c of the figure. The upper face of the projection 8 which has now been formed in the plate through the intervention between the surface of the plate and the electrolyte of the inner ring 21 during the first part of the etching process, is now at the required level below the level of the upper face of the marginal portion 6 of the plate to provide the gap 9 hereinbefore referred to in the description of Figure 1, which gap appears in portion d of Figure 2.

It will be appreciated that the foregoing particular method of etching the diaphragm forming plate 5 is only one possible method. Any other convenient method may be employed, and as already remarked, electro deposition may be used instead of electrolytic etching if desired.

Referring now to Figures 3 and 4, the pump-filter combination shown in these figures comprises, as in the embodiment illustrated in Figure 1, a top plate (block 1), a bottom plate 2, a flexible diaphragm 5 and a transducer constituted by a laminated unit 15 of magnetostrictive material in combination with a coil 16 wound on a bobbin 17.

The construction as regards these parts is identical with that of the said embodiment illustrated in Figure 1. The unit 15, in the embodiment illustrated in Figures 3 and 4, forms also a filter for the liquid fuel as already remarked, said filter embodying the invention forming the subject matter of the aforesaid application Serial No. 529,772.

Thus its component laminae 22 are formed with interfacial recesses and/or reliefs, shown as shaded areas S in Figure 3, for the passage of the fuel across the faces of the laminate in the manner characteristic of an edge-type filter, and also with slot-shaped apertures 23 (see Figure 3) which register with one another in the pack of laminae so as to provide collectively a series of lanes 24, 25, 26, 27, 28, 29 and 30 along which the fuel flows in making its way through the filter, alternate lanes 24, 26, 28 and 30 forming inflow lanes leading to the filter edges from an inlet passage 31 in the filter structure communicating with the fuel supply by way of an inlet 32 and the remaining lanes 25, 27 and 29 outflow lanes leading from the filter edges to an outlet passage 33 in said filter structure communicating with the pump chamber 10 of the pump by way of an outlet 34. The connection between the outlet 34 and the inlet of the pump chamber is not shown. Any convenient form of connection may obviously be employed, and it will be understood that the particular form and arrangement of the inflow and outflow lanes of the filter unit may vary widely to suit, for example, the operating requirements of the filter and also the shape and general design of the pump as a whole.

The laminae to form the filter unit, which as already remarked constitutes also the driving element of the pump, may conveniently be produced by electrolytic etching or electro deposition.

As already indicated, the arrangement may either be one in which a single pump supplies all of the cylinders of the engine by way of a distributor or one in which each cylinder has its own pump, in which latter case the pump would feed the relative cylinder direct. Any convenient form of distributor may be employed in the event of the former arrangement being used. In either case it is possible to employ a combined pump-filter unit (Figures 3 and 4).

The arrangement illustrated in Figure 5 is one in which the supply current to the driving element of the pump (magnetostrictive unit and its associated coil) is varied automatically in dependence upon the required engine speed by means of an iron core 35 co-operating with a winding 36 in the supply circuit of the coil 16 of the driving element, said core 35 being interconnected with the accelerator pedal 37 or equivalent speed control means of the engine. Any alternative arrangement may of course be employed.

In the event of the pump being a piston pump, the arrangement may be one in which, as shown in Figure 6, a short-stroke large-area piston 38 working in a cylinder 39 is reciprocated by a laminated unit 15 similar to the units 15 of the previously described arrangements, the cut-off action in the operation of the pump, with respect to the fuel inlet 40 of the pump chamber relatively to the fuel outlet 41 thereof, being effected by the piston 38 in the course of its working (upward in the figure) stroke, the piston being arranged for this purpose to cover in conventional manner an inlet port 42 in the well of the cylinder communicating with the inlet 40.

Various modifications are possible; for example the driving thrust from the driving element of the pump to the diaphragm or piston element may be communicated if desired hydraulically, instead of mechanically as in the particular embodiments of the invention shown in the drawings, and the form, proportions and arrangement of the component parts of the pump may vary widely from those of the particular construction illustrated within the general spirit and principle of the invention. All such modifications are to be understood as within the scope of the invention as delineated in the appended claims.

What I claim as my invention and desire to secure by Letters Patent of the United States is:

1. An electrically operated diaphragm pump for fluids comprising in combination a complementary pair of parts consisting as regards one of the parts of a rigid block and as regards the other of a flat plate, said plate being secured to one face of said block in face to face relation thereto, a recess in at least one of said parts defining with the surface opposite thereto of the other part an interfacial space constituting the working chamber of the pump, said plate being flexible and constituting the diaphragm of the pump, said working chamber being of shallow proportions by reason of its depth dimension in the direction of oscillation of the diaphragm being a small fraction only of its diameter dimension, a projection from the face of at least one of said parts extending partially across the working chamber depthwise thereof, said projection being adapted in the course of each stroke of oscillation of the diaphragm in the direction towards the rigid block to cut off one portion of the working chamber from another portion thereof while permitting the diaphragm to complete its said stroke of oscillation, a fluid inlet leading through the rigid block to one of said portions of the working chamber, a fluid outlet leading through the rigid block to the other of said portions and electrical means for oscillating the diaphragm.

2. An electrically operated diaphragm pump according to claim 1, wherein the diaphragm is circular and the projection is of annular form, the said projection being concentric with the diaphragm.

3. An electrically operated diaphragm pump according to claim 1, wherein the diaphragm is circular and the projection is of annular form, the said projection being concentric with the diaphragm and located nearer to the periphery than to the centre thereof.

4. An electrically operated diaphragm pump according to claim 1, in which the cut off occurs during an initial portion of said stroke.

5. An electrically operated diaphragm pump according to claim 1, in which the electrical means operates by magneto striction effects, the said means consisting of an element composed of material susceptible to dimensional change under the influence of a magnetic flux flowing through the material, said element being in thrust transmitting relation to the diaphragm of the pump whereby dimensional change in the element is caused to produce oscillatory movement of the diaphragm, in combination with an excitation winding for the element, means for supplying operating current to said winding, and means for varying the supply of said current with resulting variation of the quantity of fluid deliverable from the pump per oscillation of the diaphragm.

6. An electrically operated diaphragm pump according to claim 1, in which the electrical means operates by piezo electric effects, the said means consisting of an element composed of material susceptible to form a change under the influence of electric potential applied to the material, said element being in thrust transmitting relation to the diaphragm of the pump whereby form change in the element is caused to produce oscillatory movement of the diaphragm, and wherein said element is provided in combination with means for applying to the element operating current of variable potential, the variation of said potential resulting in corresponding variation of the quantity of fluid deliverable from the pump per oscillation of the diaphragm.

7. An electrically operated diaphragm pump according to claim 1, wherein the electrical means operates by piezo electric effects, the said means consisting of an element composed of material susceptible to form change under the influence of electric potential applied to the material, said element being in thrust transmitting relation to the diaphragm of the pump whereby form change in the element is caused to produce oscillatory movement of the diaphragm.

8. An electrically operated diaphragm pump according to claim 1, wherein the electrical means operates by magneto striction effects, the said means consisting of an element composed of material susceptible to dimensional change under the influence of magnetic flux flowing through the material, said element being in thrust transmitting relation to the diaphragm of the pump whereby dimensional change in the element is caused to produce oscillatory movement of the diaphragm, in combination with an excitation winding for the element, and wherein the said element constitutes the filtering medium of a filter of the edge type in which the filtering medium has an inlet side at which the fluid enters the medium and an outlet side at which the fluid leaves the medium, said filtering medium being constituted by an assemblage of filter plates disposed in face to face relation with the intervention between them of fine interfacial flow passages for the fluid defined by the mutually opposed surfaces of the plates, means for clamping said filter plates together in said relation, said assemblage having an edge face thereof constituted by the edges of the filter plates at said inlet side of the filtering medium, at which edge face at least part of the filtering action takes place, any balance taking place in said flow passages, entrances for the fluid by way of which the latter enters the filtering medium, the said entrances being constituted by the bounding edges of the plates where these extend along said edge face, said plates being disposed in planes transverse to the general plane of the diaphragm of the pump and the arrangement being such that at each impulse of current through said excitation winding the resulting momentary shock in the plates accompanying the dimensional change therein which produces the oscillation of the diaphragm, is effective to disturb the plates along the said edges thereof with resulting dislodgement of any accumulations of solid matter from the fluid tending to clog said entrances or prevention of formation of such accumulations.

9. An electrically operated diaphragm pump according to claim 1, wherein the electrical means operates by magneto striction effects, the said means consisting of an element composed of material susceptible to dimensional change under the influence of magnetic flux flowing through the material, said element being in thrust transmitting relation to the diaphragm of the pump whereby dimensional change in the element is caused to produce oscillatory movement of the diaphragm, in combination with an excitation winding for the element, and wherein the said element constitutes the filtering medium of a filter of the edge type in which the filtering medium has an inlet side at which the fluid enters the medium and an outlet side at which the fluid leaves the medium, said filtering medium being constituted by an assemblage of filter plates disposed in face to face relation with the intervention between them of fine interfacial flow passages for the fluid defined by the mutually opposed surfaces of the plates, means for clamping said filter plates together in said relation, said assemblage having an edge face thereof constituted by the edges of the filter plates at said inlet side of the filtering medium, at which edge face at least part of the filtering action takes place, any balance taking place in said flow passages, entrances for the fluid by way of which the latter enters the filtering medium, the said entrances being constituted by the bounding edges of the plates where these extend along said edge face, said plates being disposed in planes transverse to the general plane of the diaphragm of the pump and the arrangement being such that at each impulse of current through said excitation winding the resulting momentary shock in the plates accompanying the dimensional change therein which produces the oscillation of the diaphragm, is effective to disturb the plates along the said edges thereof with resulting dislodgement of any accumulations of solid matter from the fluid tending to clog said entrances or prevention of formation of such accumulations, said element being interposed between the diaphragm and a rigid member in stationary relation to said rigid plate.

10. An electrically operated diaphragm pump according to claim 1, wherein the electrical means operates by magneto striction effects, the said means consisting of an element composed of material susceptible to dimensional change under the influence of magnetic flux flowing through the material, said element being in thrust transmitting relation to the diaphragm of the pump whereby dimensional change in the element is caused to produce oscillatory movement of the diaphragm, in combination with an excitation winding for the element, and wherein the said element constitutes the filtering medium of a filter of the edge type in which the filtering medium has an inlet side at which the fluid enters the medium and an outlet side at which the fluid leaves the medium, said filtering medium being constituted by an assemblage of filter plates disposed in face to face relation with the intervention between them of fine interfacial flow passages for the fluid defined by the mutually opposed surfaces of the plates, means for clamping said filter plates together in said relation, said assemblage having an edge face thereof constituted by the edges of the filter plates at said inlet side of the filtering medium, at which edge face at least part of the filtering action takes place, any balance taking place in said flow passages, entrances for the fluid by way of which the latter enters the filtering medium, the said entrances being constituted by the bounding edges of the plates where these extend along said edge face, said plates being disposed in planes transverse to the general plane of the diaphragm of the pump and the arrangement being such that at each impulse of current through said excitation winding the resulting momentary shock in the plates accompanying the dimensional change therein which produces the oscillation of the diaphragm, is effective to disturb the plates along the said edges thereof with resulting dislodgement of any accumulations of solid matter from the fluid tending to clog said entrances or prevention of formation of such accumulations, said element beieng interposed between the diaphragm and a rigid member connected to said rigid block by frame members intervening between these parts and forming therewith a rigid unitary structure.

11. An electrically operated diaphragm pump according to claim 1, wherein the electrical means operates by magneto striction effects, the said means consisting of an element composed of material susceptible to dimensional change under the influence of magnetic flux flowing through the material, said element being in thrust transmitting relation to the diaphragm of the pump whereby dimensional change in the element is caused to produce oscillatory movement of the diaphragm, in combination with an excitation winding for the element.

12. An electrically operated diaphragm pump according to claim 11, wherein the said element is interposed between the diaphragm and a rigid member in stationary relation to the rigid block, the element being disposed with its direction of dimensional change transverse to the general plane of the diaphragm.

13. An electrically operated diaphragm pump according to claim 11, wherein the said element is interposed between the diaphragm and a rigid member in stationary relation to the rigid block, the element being disposed with its direction of dimensional change transverse to the general plane of the diaphragm and said rigid member being connected to said rigid block by frame members intervening between these parts and forming therewith a rigid unitary structure.

14. A pump-filter combination for fluids comprising a diaphragm pump, the diaphragm of which is oscillated by a driving element therefor composed of a material susceptible to dimensional change under the influence of magnetic flux flowing through the material, said element being in thrust transmitting relation to the diaphragm of the pump, whereby dimensional change in the element is caused to produce oscillatory movement of the diaphragm, and an excitation winding for the element, said element constituting at the same time a filter for the fluid which is moved by the pump, said filter being of the edge type in which the filtering medium has an inlet side at which the fluid enters the medium and an outlet side at which the fluid leaves the medium, said filtering medium being constituted by an assemblage of filter plates disposed in face to face relation with the intervention between them of fine interfacial flow passages for the fluid defined by the mutually opposed surfaces of the plates, means for clamping said filter plates together in said relation, said assemblage having an edge face thereof constituted by the edges of the filter plates at said inlet side of the filtering medium, at which edge face at least part of the filtering action takes place, any balance taking place in said flow passages, entrances for the fluid by way of which the latter enters the filtering medium, the said entrances being constituted by the bounding edges of the plates where these extend along said edge face, said plates being disposed in planes transverse to the general plane of the diaphragm of the pump and the arrangement being such that at each impulse of current through said winding the resulting momentary shock in the plates accompanying the dimensional change therein which produces the oscillation of the diaphragm, is effective to disturb the plates along the said edges thereof, with resulting dislodgement of any accumulations of solid matter from the fluid tending to clog said entrances or prevention of formation of such accumulations.

References Cited in the file of this patent

UNITED STATES PATENTS 2,317,166    Abrams _____ Apr. 20, 1943